United States Patent [19]

Gerber

[11] Patent Number: 4,606,770
[45] Date of Patent: Aug. 19, 1986

[54] ADDITIVE FOR HYDRAULIC CEMENT MIXES

[75] Inventor: Arthur H. Gerber, Solon, Ohio

[73] Assignee: Sandoz Ltd., Basel, Switzerland

[21] Appl. No.: 670,772

[22] Filed: Nov. 13, 1984

[51] Int. Cl.$^4$ ............................................. C04B 7/35
[52] U.S. Cl. .............................. 106/90; 106/314; 106/315
[58] Field of Search ................ 106/90, 93, 314, 315

[56] References Cited

U.S. PATENT DOCUMENTS

| | | | |
|---|---|---|---|
| 3,767,436 | 10/1973 | Peppler et al. | 106/90 |
| 3,785,839 | 1/1974 | Peppler et al. | 106/90 |
| 3,864,290 | 2/1975 | Peppler et al. | 106/90 |
| 4,064,191 | 12/1977 | Parekh | 428/458 |
| 4,473,405 | 9/1984 | Gerber | 106/90 |

OTHER PUBLICATIONS

Chem. Abstracts 91: 93124k (1979).
Chem. Abstracts 90: 205674c (1979).

*Primary Examiner*—William R. Dixon, Jr.
*Assistant Examiner*—Steven Capella
*Attorney, Agent, or Firm*—Gerlad D. Sharkin; Robert S. Honor; Walter F. Jewell

[57] ABSTRACT

A hydraulic cement mix including hydraulic cement, aggregate, sufficient water to affect hydraulic setting of the cement, and an additive comprising an N-methylol amide, specifically, tri- or tetramethylolglycoluril alone or in combination with other accelerators of set. The additive is present in an amount sufficient to decrease the time necessary for the hardening of the concrete mix. Generally, the additive is present in a total amount of up to about 4.0% by weight based upon the weight of cement in the mix, usually in an amount of between about 0.01% and about 2.50% by weight of cement. The latter concentration is present when complex combinations of accelerators of set for hydraulic cement are employed.

26 Claims, No Drawings

ADDITIVE FOR HYDRAULIC CEMENT MIXES

BACKGROUND OF THE INVENTION

This invention relates to additive compositions, otherwise known as admixtures, for incorporation in hydraulic cement mixes, for example, hyraulic cement concretes, mortars, and grouts, neat cement mixes, concrete block mixes, and dry mixes for making such concretes, mortars, grouts, especially to accelerate their rate of hardening and setting.

A variety of techniques have been employed to accelerate the hardening of hydraulic cement mixes. These techniques are employed because of circumstances or conditions that render unduly extended the time required for hardening of such mixes in given applications. The rate of hydration of portland cement is very dependent upon temperature, for example, so that concrete containing it will often harden at a slower rate than desired during the winter season unless provisions are taken to accelerate the hardening process. Among the various techniques employed for this purpose are the increasing of the proportion of portland cement in the mix; the use of more rapid setting types of cements available; the heating of the water and other components of the concrete; and the use of chemical admixtures that act, catalytically or otherwise, to increase the rate at which the concrete hardens.

A number of chemical agents that serve to accelerate the rate of hardening of concrete are known in the art. Calcium chloride in particular is well known as an effective and economic accelerator. In use, however, calcium chloride is known to have certain disadvantages, principally at elevated usage rates it tends to promote corrosion of metal embedded in, or in contact with, the calcium chloride-containing concrete. Other agents which do not promote corrosion of metal, but have a less pronounced effect in accelerating the rate of hardening of concrete include: alkanolamines, aldehyde condensates of urea and melamine disclosed in U.S. Pat. No. 3,785,839 issued to Peppler, et al., on Jan. 15, 1974, U.S. Pat. No. 3,864,290 issued to Peppler, et al., on Feb. 4, 1974, and U.S. Pat. No. 3,767,436 issued to Peppler, et al., on Oct. 23, 1973; formate salts disclosed in U.S. Pat. No. 4,261,755 issued to Berry, et al., on Apr. 14, 1981 and U.S. Pat. No. 4,419,138 issued to Popovics on Dec. 6, 1983; thiocyanates disclosed in U.S. Pat. No. 4,373,956 issued to Rosskopf on Feb. 15, 1983; carbonates and carbonyl compounds disclosed in U.S. Pat. No. 4,264,367 issued to Schutz on Apr. 28, 1981 and U.S. Pat. No. 4,257,814 issued to Kellet, et al., on Mar. 24, 1981; and alkali-metal nitrates, thiocyanates and alkanolamines disclosed in U.S. Pat. No. 4,473,405 issued to Gerber on Sept. 25, 1984.

There is a continuing need in the art, therefore, for improved set accelerating agents. In particular, there is a need for stable and safe set accelerating agents capable of rapidly accelerating the rate of set of portland cement mixes. In addition, of course, there is a continuing desire in the art for admixtures capable of permitting other advantages, such as reduction of the water content of the mix and improved compressive strength of the hardened concrete.

Another use for chemical accelerators is to overcome retardation caused by strength enhancing admixtures. Many admixtures employed to achieve improved compressive strength are known to act also as set retarders, and such admixtures slow the chemical process of hydration so that the concrete remains plastic and workable for a longer time than concrete without such a retarder. While admixtures having set retarding and compressive strength improving properties are useful per se, frequently there are instances where improved compressive strength is desired by any significant retarding of the rate of hardening of the cement or concrete mix would be undesirable. In such an instance, it is desirable to overcome the retarding effect by using accelerators.

SUMMARY OF THE INVENTION

The present invention relates to the incorporation of an admixture having methylol derivatives such as hydroxylmethylolated amides also referred to as N-methylolated amides, specifically N-methylol derivatives of glycoluril, also referred to as acetylenediurea, in hydraulic mixes comprising portland cement, aggregate and water to accelerate the setting of the mix. Such glycoluril derivatives are further disclosed in U.S. Pat. No. 4,064,191 issued to Parekh on December 1977 which is hereby incorporated by reference. Typical of such materials are hydroxymethylated adducts of glycoluril. The subject adducts, condensates of glycoluril with three or four equivalents of formaldehyde, conveniently trimethylolglycoluril or tetramethylolglycoluril, can be added in amounts of from about 0.01 to 0.25 percent, preferably from about 0.01 to 0.10 percent, by weight of cement. Hydraulic cement mixes in which the subject adducts are incorporated also tend to require less water content for a given consistency of mix than is required with the more toxic formaldehyde admixture. Such adducts are water soluble and are stable in acidic mediums having a pH in the range of 4 to 7.

This invention includes the process for accelerating the rate of set of hydraulic cement mixes and the improved hydraulic cement mix having the subject adduct incorporated therein. In another aspect thereof, the invention includes novel admixture combinations comprising said amide adducts and other set accelerating agents, such as inorganic salts like nitrates, nitrites, chlorides, thiocyantes, water-soluble formates, and, for applications in which water reduction without set acceleration is desired, these combinations of compounds are used with strength enhancing agents, e.g. calcium lignosulfonate.

Broadly, the invention comprises a hydraulic cement mix including hydraulic cement, aggregate, sufficient water to effect the hydraulic setting of the cement, and an additive comprising a mixture of a water soluble, polymethylolated glycoluril in combination with alkali or alkaline-earth salts of nitrates, thiocyanates and an alkanolamine, i.e., triethanolamine, diethanolamine or bicine, which additive is present in a total amount of up to about 4.0 percent by weight based upon the weight of cement, perferably in an amount in the range of about 0.2% to about 2.5% by weight. Use of the additive is beneficial to the properties of hydraulic cement mixes in that it results in products with an accelerated rate of hardening and setting over similar mixes prepared without the additive, without causing the corrosion problems present with high levels chloride accelerators, such as calcium chloride. Further, use of this additive in concrete within the preferred ranges generally results in an increase in the compressive strength of the hardened hydraulic mixes.

It is, therefore, an object of the present invention to provide an improved process for accelerating the hardening of portland cement mixes.

It is another object of the invention to provide a technique for accelerating the rate of hardening of hydraulic cement mixes without undesired corrosive or toxic effects.

It is another object of the invention to provide improved chemical admixtures for portland cement mixes which are stable in acid media in the pH range of 4 to 7.

It is another object of the invention to provide a concrete admixture which is particularly effective at low temperatures, i.e., 50° F. or lower.

These and other objects of the invention will become apparent to those skilled in the art from the following detailed description of the present invention with the novel features thereof being pointed out in the claims appended hereto.

DETAILED DESCRIPTION OF THE PREFERRED EMBODIMENTS

For the purposes of this invention, the term "hydraulic cement" is intended to mean and to include all cementitious compositions capable of being set and hardended by the action of water, such as portland cements, sulfate-resisting cements, blast-furnace slag cements, pozzolanic cements, and high alumina cements, since the admixture of the present invention can be incorporated into all hydraulic cement mixes. But the preferred use of the present composition or admixture is in portland cement mortars and concretes. Also for the purposes of this invention, the term "portland cement", is intended to include all cementitious compositions which have a high content of calcium silicate and are portland cement or are chemically similar or analogous to and therefore portland cement type, the specification for which is set forth in American Society for Testing and Materials specification ASTM C 150-81. This would include cements in which fly ash, as from steam or power generating facilities, limestone, pozzolanic slag, as from blast furnaces, or mixtures of these, are incorporated and are considered portland cements, or portland blended cements such as those in ASTM C 595-82. The present invention permits acceleration of the rate of set of hydraulic cement mixes, particularly at low temperatures without the corrosive effects associated with the use of high levels of calcium chloride. The setting time which results from a particular admixture in accordance with the present invention will vary for specific applications depending upon the composition and concentration of the mixture, the water-cement ratio, the nature and quantity of aggregates used, the composition of the cement, and the temperature and other conditions under which the constituents are mixed and placed. A preferred accelerator in accordance with the present invention includes a mixture of sodium nitrate, sodium thiocyanate, triethanolamine, and a methylol derivative stable at pH values between 4–7. Other amines such as diethanolamine and bicine also may be used. When this mixture is blended with a portland cement mortar, the weight percent of the sodium nitrate to that of cement is preferably in the range from about 0.025 to about 4.0; the weight percent of sodium thiocyanate is preferably in the range from about 0.025 to about 4.0; the weight percent of triethanolamine is preferably in the range from about 0.001 to about 0.05; and the weight of percent of hydroxymethylated amide is preferably from about 0.01 to about 0.20 percent.

Preferred methylol derivatives for the present invention are trimethylolglycoluril and tetrametlylolglycoluril. The admixture constituents are selected such that the admixture is slightly acid to neutral in pH, allowing it to be handled without the special precautions required in connection with the more caustic prior-art admixtures.

The accelerating admixtures of the present invention cause no reaction with ferrous metals and are thus suitable for use in connection with reinforced or prestressed concretes as well as in other applications involving a cement, mortar, or concrete-metal interface.

It has been found that water reducers, i.e., admixtures that lower the mixing requirements of water for a given mix consistency, often also act as retarders that slow the chemical process of hydration of the portland cement so that the mix remains plastic and workable for a longer period of time. For this reason, set accelerators are often used together with water reducers in order to overcome the retarding tendency of the water reducer. The accelerator thus increases the rate of hydration of early strength development, while the lower water content of the mix results in an increase in the ultimate compressive strength of the hardened concrete. Low temperatures also effect the rate of hydration and early strength development of portland cement mixtures causing a significant decrease in both which leads to later setting times and lower early strength gain. The ability of the adducts of the present invention to accelerate the rate of set of concrete provides valuable flexibility in the art of hydraulic cement mix control.

In the preferred embodiments of the invention, the adducts employed comprise monomeric trimethylolglycoluril and tetramethylolglycoluril. These chemical compounds show good chemical stability in neutral to slightly acidic pH systems, are accelerators of set for concrete, and exhibit additivity when combined with other known inorganic or organic accelerators such as calcium chloride, calcium nitrate, and sodium thiocyanate. The adducts of the invention can be employed without corrosive effect on metal embedded in the hardened concrete and without imparting objectionable and toxic fumes to the concrete. The adduct is generally added as an aqueous solution either alone or in combination with other known concrete accelerators; however, it can be employed in a dry powder form or in aqueous mixtures of any desired concentration.

In the practice of invention, the subject adducts are employed in an amount within the range of from about 0.01 to percent to about 0.25 percent, preferaby from about 0.04 percent to about 0.07 percent by weight of cement in the overall mix. It is also within the scope of the invention to incorporate other additions for the purpose for which they are normally employed in conventional hydraulic cement mixes containing the adducts of the present invention in the amounts indicated for the purpose of accelerating the rate of set of the concrete. Illustrations of the type of additions that may be thus employed are, for example, air-entraining agents, air-detraining agents, pozzolanic materials, fly ash, coloring materials, and water repellents. Other well known additive materials may also be used to accomplish their normal and intended function.

Among such other additives that may be employed together with the set accelerating adduct of the invention are other well known set accelerators including calcium chloride. In the embodiment, the combination of accelerators is employed to achieve a rate of hardening that exceeds the acceleration obtainable by means of the adduct of the invention alone. The adducts of the invention may be employed together with known water-reducing set retarders thus balancing the retarding effect resulting in a concrete with a rate of hardening essentially unchanged by the admixture addition. The lignosulfonates, e.g., calcium, sodium and ammonium lignosulfonates, can advantageously be employed as set retarders in this aspect of the invention.

In order to demonstrate the desirable features of the invention, the following examples are set forth, it being understood that the examples are presented for illustrative purposes and are not intended to limit the scope of the invention as set forth in the appended claims.

ylol derivatives were compared with an equivalent plain concrete mix, the results being set forth in Table 1 below:

TABLE 1

| Mix No. | Additive | Amount of Additive % by Weight of Cement | Water Content (gal/cu yd of Concrete) | Air, Vol % of Concrete | Initial Time of Set hr[1] |
|---|---|---|---|---|---|
| 1. | None | | 37.0 | 1.3 | 8¼ |
| 2. | Trimethylolglycoluril | 0.02 | 35.5 | 1.7 | 7¾ |
| 3. | Trimethylolglycoluril | 0.07 | 35.0 | 1.7 | 7¼ |
| 4. | Tetramethylolglycoluril | 0.02 | 35.5 | 1.5 | 6¼ |
| 5. | Tetramethylolglycoluril | 0.07 | 35.5 | 1.7 | 6¾ |

Note
[1]ASTM C 403-80, Standard Test Method for Time of Setting of Concrete Mixtures by Penetration Resistance Both N-methylolated amides are shown to provide substantial set acceleration as compared with hydraulic cement mixes containing no accelerator additive.

EXAMPLE 2

In the following experiments a commercially available N-methylolated amide was added to a hydraulic cement mix containing other known concrete accelerators. The results of the tests at 50° F. compared with an equivalent plain concrete mix, and mixes containing other accelerating additives known in the art are shown in Table 2 below.

TABLE 2

| Mix No. | Additive | Amount of Additive (% by Weight of Cement) | Water Content (gal/on yd of Concrete) | Air, Vol % of Concrete | Initial Time of Set hr |
|---|---|---|---|---|---|
| 6. | None | | 37.7 | 1.8 | 8¾ |
| 7. | Tetramethylolglycoluril (TMGU) | 0.05 | 36.7 | 1.8 | 6¼ |
| 8. | TMGU | 0.10 | 36.7 | 2.0 | 6¾ |
| 9. | Calcium nitrate | 0.50 | 37.2 | 1.8 | 7¾ |
| 10. | Calcium nitrate<br>TMGU | 0.50<br>0.01 | 37.7 | 1.8 | 6¾ |
| 11. | Calcium nitrate<br>TMGU | 0.50<br>0.05 | 36.7 | 1.8 | 5¼ |
| 12. | Calcium nitrate<br>TMGU | 0.50<br>0.10 | 37.0 | 1.9 | 5⅛ |
| 13. | Sodium thiocyanate | 0.20 | 37.0 | 1.7 | 7¼ |
| 14. | Sodium thiocyanate<br>TMGU | 0.20<br>0.05 | 37.2 | 1.9 | 6 |
| 15. | Calcium nitrate<br>Sodium thiocyanate<br>TMGU | 0.50<br>0.20<br>0.05 | 37.0 | 1.9 | 4⅝ |
| 16. | Calcium nitrate<br>Trimethylolglycoluril | 0.50<br>0.05 | 37.2 | 1.7 | 5¼ |
| 17. | Calcium nitrate | 1.500 | 37.2 | 1.9 | 6¼ |
| 18. | Calcium nitrate<br>Trimethylolglycoluril | 1.500<br>0.05 | 37.4 | 1.8 | 3⅝ |

EXAMPLE 1

Trimethylolglycoluril and tetramethylolglycoluril were used in various comparative tests in which the advantages of the invention were demonstrated with respect to hydraulic cement mixes comprising portland cement, aggregate and sufficient water to affect hydraulic setting of the cement. The same type and brand of cement was used in each mix, and the kind and proportion of coarse and fine aggregate employed were likewise substantially the same. The amount of water added in each instance was such as to produce concrete mixes of essentially the same consistency. Initial temperature of the concrete and ambient temperature during the tests were 50° F. In one set of tests, the use of the meth- The results set forth in this table establish the incorporation of tetramethylolglycoluril (TMGU) or trimethylolglycoluril in hydraulic cement mixes causes a significant increase or acceleration of the rate of set of the concrete. Furthermore, TMGU is especially effective when utilized in combination with other accelerators for concrete even at concentration levels as low as 0.01 percent by weight of cement. The accelerating effect was increased as the dosage of the amide employed was increased from 0.01 percent up to 0.10 percent by weight of cement. The TMGU was employed as an aqueous solution having a solids content of about 50 percent by weight without any objectionable toxic fumes or odor.

EXAMPLE 3

In further tests it was shown that TMGU is effective with increased weight percent of cement concentrations of many inorganic and organic accelerators well known in the art. Results of cold temperature concrete tests are shown in the following Table 3.

TABLE 3

| Mix No. | Additive | Amount of Additive (% by Weight of Cement) | Water Content (gal/cu yd of Concrete) | Air, Vol % of Concrete | Initial Time of Set hrs |
|---|---|---|---|---|---|
| 19. | None | | 37.0 | 1.3 | 8¼ |
| 20. | Calcium nitrate | 2.00 | | | |
| | Sodium thiocyanate | 0.20 | | | |
| | Triethanolamine | 0.01 | 35.6 | 1.7 | 4¼ |
| 21. | Calcium nitrate | 2.00 | | | |
| | Sodium thiocyanate | 0.20 | | | |
| | Triethanolamine | 0.01 | | | |
| | Tetramethylolglycoluril | 0.04 | 36.3 | 1.5 | 3½ |
| 22. | Calcium nitrate | 0.800 | | | |
| | Sodium nitrite | 0.400 | | | |
| | Sodium thiocyanate | 0.12 | | | |
| | Triethanolamine | 0.01 | | | |
| | TMGU | 0.04 | 36.0 | 2.1 | 4¾ |

EXAMPLE 4

Where there is no prohibition on the use of calcium chloride as an accelerating admixture for concrete, the adducts furnish, in combination with chlorides, more acceleration than chloride alone. Also, the combination of the accelerating agents of the present invention with water-reducing set retarding agents results in a concrete mix less retarding than a mix containing the water-reducing agent (WRA) alone. Table 4 contains the results of tests of concrete produced at 50° F. Table 5 contains the results of tests of concretes produced at 70° F.

TABLE 4

| Mix No. | Additive | Amount of Additive (% by Weight of Cement) | Water Content (gal/cu yd of Concrete) | Air, Vol % of Concrete | Initial Time of Set hrs |
|---|---|---|---|---|---|
| 23. | None | | 36.6 | 1.4 | 8¼ |
| 24. | Calcium chloride | 0.25 | 35.4 | 1.5 | 7½ |
| 25. | Calcium chloride | 0.25 | 35.4 | 1.5 | 6⅞ |
| | TMGU | 0.02 | | | |
| 26. | Calcium chloride | 0.25 | | | |
| | TMGU | 0.02 | | | |
| | Bicine | 0.005 | 36.0 | 1.4 | 6⅞ |

TABLE 5

| Mix No. | Additive | Amount of Additive (% by Weight of Cement) | Water Content (gal/cu yd of Concrete) | Air, Vol % of Concrete | Initial Time of Set hrs |
|---|---|---|---|---|---|
| 27. | None | | 45.3 | 0.8 | 5¾ |
| 28. | WRA[2] | 0.22 | 38.8 | 2.7 | 7¾ |
| 29. | WRA[2] | 0.22 | | | |
| | Calcium nitrate | 1.666 | | | |
| | Sodium Thiocyanate | 0.111 | | | |
| | TMGU | 0.044 | 39.2 | 2.4 | 4¾ |

Note.
[2]Water-reducing Agent

The incorporation of relatively small amount of N-methylolated amides, conveniently tri- and tetramethyloglycoluril results in an advantageous increase in the rate of hardening of hydraulic cement mixes. The use of such materials is free of corrosive effects and of an undesirable evolution of toxic fumes which accompany the use of many formaldehyde condensates when utilized in a concentrated solution at pH 4–7. Because of the ability of the subject adducts to operate effectively in combination with known set accelerating agents in particular to provide a desired combination of beneficial effects, a further embodiment of the invention resides in admixture combinations of the adducts and such known accelerating agents. In such admixture or additive compositions, the relative amounts of the subject amides and of the conventional agents may, as will be appreciated in the art, be subject to wide variation depending upon the particular additive and effects desired in any given application. It wil be recognized that such additive compositions can be added in dry powder form or in liquid mixtures of any desired concentration. The specific examples provide illustrative instances in which additive combinations are used to achieve as much acceleration as possible. The present invention in all its embodiments, therefore, represents a significant and commercially useful advance in the art of controlling the hardening of hydraulic cement. As such, the invention provides a valuable flexibility to facilitate the control of the setting time of cement for particular applications and operating conditions.

What is claimed is:

1. A hydraulic cement mix comprising portland cement, aggregate, sufficient water to effect hydraulic setting of the cement and a set accelerating effective amount of an admixture comprising a poly(N-methylol) derivative of glycoluril.

2. A hydraulic cement mix of claim 1 comprising portland cement, aggregate, sufficient water to effect hydraulic setting of the cement and a set accelerating effective amount of an admixture comprising a poly(N-methylol) derivative of glycoluril and one or more materials selected from the group consisting of alkanolamines and inorganic salts of nitrates, nitrites, thiocyanates, chlorides and water soluble formates.

3. The hydraulic cement mix of claim 2 in which said methylol derivative is trimethylolglycoluril present in an amount within the range of from about 0.01 percent to about 0.20 percent by weight of cement.

4. The hydraulic cement mix of claim 2 in which said methylol derivative is tetramethylolglycoluril present in an amount within the range of from about 0.01 percent to about 0.20 percent by weight of cement.

5. The hydraulic cement mix of claim 2 in which said admixture further comprises an alkali metal nitrate present in an amount within the range of from about 0.025 percent to about 4.0 percent by weight of cement.

6. The hydraulic cement mix of claim 2 in which said admixture further comprises an alkaline earth metal nitrate present in an amount within the range of from about 0.025 percent to about 4.0 percent by weight of cement.

7. The hydraulic cement mix of claim 2 in which said admixture further comprises alkali nitrites present in an amount within the range of from about 0.025 percent to about 4.0 pecent by weight of cement.

8. The hydraulic cement mix of claim 2 in which said admixture further comprises an alkaline earth metal nitrite present in an amount within the range of from about 0.025 percent to about 4.0 percent by weight of cement.

9. The hydraulic cement mix of claim 2 in which said admixture further comprises an alkali metal thiocyanate present in an amount within the range of from about 0.025 percent to about 4.0 percent by weight of cement.

10. The hydraulic cement mix of claim 2 in which said admixture further comprises an alkaline earth metal thiocyanate present in an amount within the range of from about 0.025 percent to about 4.0 percent by weight of cement.

11. The hydraulic cement mix of claim 2 in which triethanolamine is present in an amount within the range of from about 0.001 percent and 0.05 percent by weight of cement.

12. The hydraulic cement mix of claim 2 in which diethanolamine is present in an amount within the range of from about 0.001 percent and 0.05 percent by weight of cement.

13. The hydraulic cement mix of claim 2 in which said admixture further comprises bicine present in an amount within the range of from about 0.001 percent and 0.05 percent by weight of cement.

14. An admixture composition for accelerating the setting of hydraulic cement compositions comprising a poly(N-methylol) derivative of glycoluril and one or more materials selected from the group consisting of alkanolamines and inorganic salts of nitrates, nitrites, thiocyanates, chlorides and water soluble formates.

15. An admixture according to claim 14 wherein said methylol derivative trimethylolglycoluril.

16. An admixture according to claim 14 wherein said is tetramethylolglycoluril.

17. An admixture according to claim 14 comprising: (a) trimethyloglycoluril or tetramethylolglycoluril; (b) an alkali or alkaline earth metal nitrate; (c) an alkali or alkaline earth metal thiocyanate; and (d) an alkanolamine.

18. In the method of setting a hydraulic cement comprising the steps of: (a) bringing together in combination portland cement, aggregate, sufficient water to effect hydraulic setting of the portland cement and an admixture for accelerating the setting; (b) mixing the resulting combination to obtain a uniform, plastic mix; (c) applying the plastic mix to the desired form; and (d) allowing the plastic mix to set; the improvement comprising employing therein as such set accelerating admixture an admixture comprising a poly(N-methylol) derivative of glycoluril.

19. A method according to claim 18 wherein the methylol derivative is trimethylolglycoluril.

20. A method according to claim 18 wherein the methylol derivative is tetramethylolglycoluril.

21. A method according to claim 18 wherein the admixture further comprises one or more materials selected from the group consisting an alkanolamine and inorganic salts of nitrates, nitrites, thiocyanates, chlorides and water soluble formates.

22. A method according to claim 21 wherein the alkanolamine is selected from the group consisting of: bicine, diethanolamine and triethanolamine.

23. The hydraulic cement mix of claim 1 in which said methylol derivative is trimethylolglycoluril or tetramethylolglycoluril present in an amount within the range of from about 0.01 percent to about 0.25 percent by weight of cement.

24. The hydraulic cement mix of claim 1 in which said methylol derivative is tetramethylolglycoluril or present in an amount within the range of from about 0.01 percent to about 0.10 percent by weight of cement.

25. The hydraulic cement mix of claim 2 in which the admixture comprises: (a) trimethylolglycoluril or tetramethylolglycoluril; (b) an alkali or alkaline earth metal nitrate; (c) an alkali or alkaline earth metal thiocyanate; and (d) an alkanolamine.

26. The hydraulic cement mix of claim 25 in which the admixture comprises, based on the dry weight of cement: (a) 0.01 to 0.2% by weight of trimethylolglycoluril or tetramethylolglycoluril; (b) 0.025 to 4.0% by weight of sodium or calcium nitrate; (c) 0.025 to 4.0% by weight of sodium thiocyanate; and (d) 0.001 to 0.05% by weight of triethanolamine.

* * * * *